(12) United States Patent
Kuhn et al.

(10) Patent No.: US 8,999,283 B1
(45) Date of Patent: Apr. 7, 2015

(54) SYSTEMS AND METHODS FOR CONVERTING CARBON DIOXIDE INTO CHEMICAL FEEDSTOCK

(71) Applicants: John Norbert Kuhn, Tampa, FL (US); Venkat R. Bhethanabotla, Tampa, FL (US); Yolanda Andreina Daza, Tampa, FL (US); Debosruti Dutta, Tampa, FL (US)

(72) Inventors: John Norbert Kuhn, Tampa, FL (US); Venkat R. Bhethanabotla, Tampa, FL (US); Yolanda Andreina Daza, Tampa, FL (US); Debosruti Dutta, Tampa, FL (US)

(73) Assignee: University of South Floria, Tampa, FL (US)

(*) Notice: Subject to any disclaimer, the term of this patent is extended or adjusted under 35 U.S.C. 154(b) by 0 days.

(21) Appl. No.: 13/905,713

(22) Filed: May 30, 2013

Related U.S. Application Data

(60) Provisional application No. 61/652,991, filed on May 30, 2012.

(51) Int. Cl.
*C01B 31/18* (2006.01)
*B01J 23/89* (2006.01)

(52) U.S. Cl.
CPC ............. *C01B 31/18* (2013.01); *B01J 23/8946* (2013.01)

(58) Field of Classification Search
USPC ................................ 423/418.2, 263; 977/773
See application file for complete search history.

(56) References Cited

U.S. PATENT DOCUMENTS

| | | | |
|---|---|---|---|
| 4,272,555 A | 6/1981 | Davis et al. | |
| 5,068,057 A | 11/1991 | Gustafson et al. | |
| 5,073,356 A | 12/1991 | Guro et al. | |
| 5,110,782 A | 5/1992 | Hirono et al. | |
| 6,565,824 B1 | 5/2003 | Lightner | |
| 2010/0226846 A1 | 9/2010 | Sundar et al. | |
| 2013/0168228 A1* | 7/2013 | Ozin et al. | 204/157.9 |

OTHER PUBLICATIONS

Tanaka, A., et al. "Gold and Copper Nanoparticles Supported on Cerium(IV) Oxide—A Photocatalyst Mineralizing Organic Acids under Red Light Irradiation". ChemCatChem vol. 3, Issue 10, pp. 1619-1623, Oct. 17, 2011.*

S Bernal, G Blanco, J.M Gatica, C Larese, H Vidal, Effect of Mild Re-oxidation Treatments with CO2 on the Chemisorption Capability of a Pt/Ce02 Catalyst Reduced at 500° C, Journal of Catalysis, vol. 200, Issue 2, Jun. 10, 2001, pp. 411-415, ISSN 0021-9517, http://dx.doi.org/10.1006/jcat.2001.3210.*

CO2 and H2O Splitting for Thermochemical Production of Solar Fuels Using Nonstoichiometric Ceria and Ceria/Zirconia Solid Solutions Alex Le Gal, Stéphane Abanades, and Gilles Flamant Energy & Fuels 2011 25 (10), 4836-4845.*

(Continued)

*Primary Examiner* — Richard M Rump
(74) *Attorney, Agent, or Firm* — Thomas | Horstemeyer, LLP

(57) ABSTRACT

In one embodiment, carbon dioxide is converted into a chemical feedstock by providing a mixture of plasmonic material and oxygen-conducting material, exposing the mixture to sunlight so that solar energy is absorbed by the plasmonic material which then heats the oxygen-conducting material so that oxygen vacancies are generated, passing carbon dioxide through the mixture, and the oxygen-conducting material removing oxygen atoms from the carbon dioxide to form carbon monoxide.

8 Claims, 10 Drawing Sheets

(56) References Cited

OTHER PUBLICATIONS

Furler et al., Syngas Production by Simultaneous Splitting of H2O and CO2 via Ceria Redox Reactions in a High-Temperature Solar Reactor, Energy & Environmental Science, 2012, pp. 6098-6103, vol. 5.

Scheffe & Steinfeld, Thermodynamic Analysis of Cerium-Based Oxides for Solar Thermochemical Fuel Production, Energy & Fuels, 2012, pp. 1928-1936, vol. 26.

\* cited by examiner

SYSTEMS AND METHODS FOR CONVERTING CARBON DIOXIDE INTO CHEMICAL FEEDSTOCK

CROSS-REFERENCE TO RELATED APPLICATION(S)

This application claims priority to U.S. Provisional Application Ser. No. 61/652,991, filed May 30, 2012, which is hereby incorporated by reference herein in its entirety.

BACKGROUND

Power plants, such as coal and natural gas plants, generate large amounts of carbon dioxide. Because carbon dioxide is a greenhouse gas, it is desirable to limit the amount of carbon dioxide that is released into the atmosphere. Although a seemingly simple solution to the problem of limiting carbon dioxide release would be to convert the carbon dioxide into other compounds, which could be used in various applications, carbon dioxide is an extremely stable molecule and is therefore difficult to break down into other components. It can therefore be appreciated that it would be desirable to have a system and method for converting carbon dioxide into other compounds.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a system and method for converting carbon dioxide into other compounds. Disclosed herein are systems and methods for converting carbon dioxide into useful chemical feedstock, such as carbon monoxide, which can be used in industrial processes including fuel synthesis and the production of carbon fiber products. In some embodiments, carbon dioxide from a source, such as a power plant, is passed through catalyst material that removes oxygen atoms from the carbon dioxide molecules to form carbon monoxide. In some embodiments, the catalyst material is an intimate mixture of oxygen-conducting material and plasmonic material that absorbs solar energy. In such cases, the heat required for the reaction can be obtained from the solar energy.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
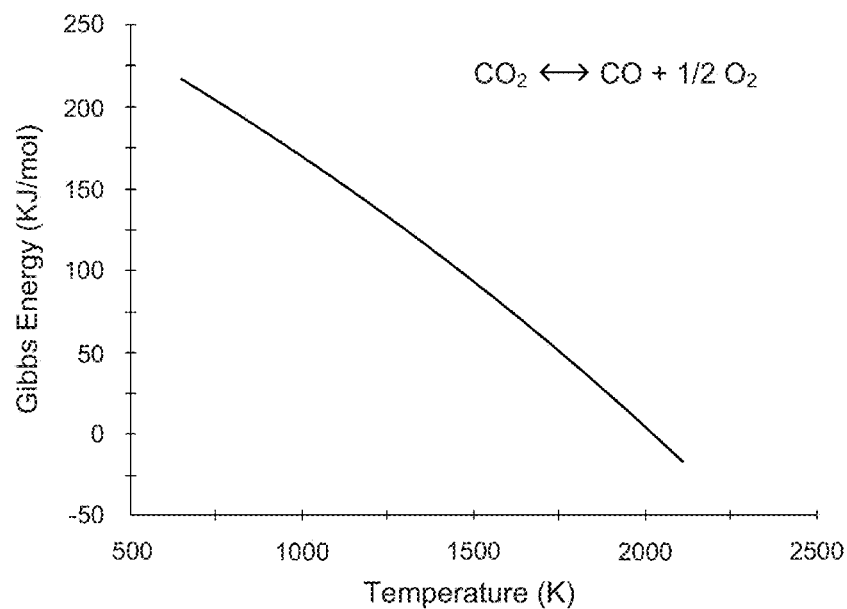
FIG. 1 is a graph that illustrates the energy for conversion of carbon dioxide into carbon monoxide and oxygen as a function of temperature.

Sustainable chemical transformation of carbon dioxide is a challenge facing our society. Although carbon dioxide is abundant, it is a stable molecule that requires a significant driving force to break down. The splitting of carbon dioxide into carbon monoxide and molecular oxygen is an unfavored reaction under typical conditions. This is illustrated in FIG. 1, which plots the Gibbs free energy for the conversion of carbon dioxide into carbon monoxide and oxygen as a function of temperature. In view of the need to break down carbon dioxide, a chemical process has been developed for transforming carbon dioxide into carbon monoxide and oxygen. A catalyst material comprising an oxygen-conducting material is used to remove oxygen atoms from the carbon dioxide. In some embodiments, the catalyst material is a composite catalyst that comprises an intimate mixture of oxygen-conducting material and plasmonic material. In such cases, solar energy can be used to heat the plasmonic material, which in turn provides the heat required to produce oxygen vacancies in the oxygen-conducting material that can remove oxygen atoms from the carbon dioxide.

Figure 2:
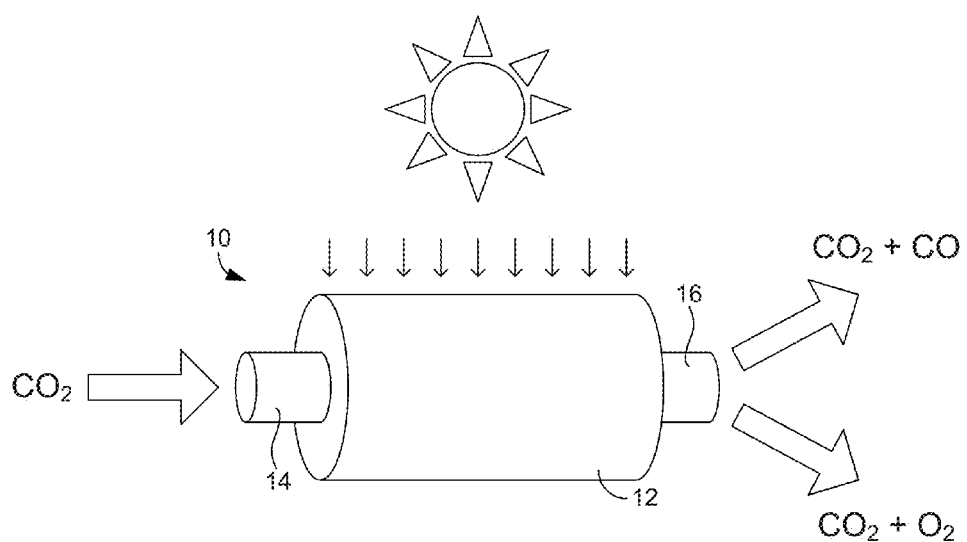
FIG. 2 is a schematic view of an embodiment of system for converting carbon dioxide into chemical feedstock.

When solar energy is to be utilized in the carbon dioxide conversion, the catalyst material can be contained in a solar reactor through which carbon dioxide can flow and into which solar energy can pass. FIG. 2 shows an example embodiment of a carbon dioxide conversion system 10 that generally comprises a solar reactor 12 that contains the catalyst material. In some embodiments, the reactor 12 comprises a tubular container having an inlet 14 and an outlet 16 and being made of a transparent or translucent material, such as quartz or a ceramic material, so that solar energy can pass through the walls of the reactor and into the catalyst material. The reactor 12 can withstand high temperatures, such as up to approximately 800° C.

The oxygen-conducting material has the capability of conducing oxygen and storing in oxygen vacancies. This capability increases with increasing temperature and decreasing oxygen partial pressure. In some embodiments, the oxygen-conducting material comprises one or more perovskite-type oxides and/or spinel-type oxides. The perovskite-type oxide can have an $ABO_3$ molecular formula and the spinel-type oxide can have an $A_2BO_4$ molecular formula, with the A site being occupied by a lanthanide or alkaline earth metal, such as lanthanum, strontium, barium, cerium, or calcium, and the B site being occupied by a transition metal such as cobalt, iron, nickel, copper, manganese, vanadium, titanium, zinc, or chromium. Both the A and B sites can be partially substituted by up to two metals. Therefore, the perovskite-type or spinel-type oxides can be easily customized to achieve desired properties, such as high oxygen mobility. An advantage of using perovskite-type or spinel-type oxides rather than a metal/metal oxide pair is that, for perovskite-type and spinel-type oxides, the oxygen release and storage are gradual processes with respect to temperature. Moreover, stability may be improved by working within a single-phase as compared to a metal/metal oxide pair oxidation and reduction process.

In some embodiments, carbon dioxide conversion may be optimal when the surface basicity of the oxide-phase is maximized in terms of its basic site density and strength. Because carbon dioxide is a stable molecule, its activation is likely to be the rate-determining step. Perovskite-type and spinel-type oxides have many formulations yielding sites of a basic nature. Moreover, surface basicity and oxygen mobility have been linked. Thus, generally speaking, the oxide material with the highest surface basicity may also have the most oxygen vacancies and a lower onset temperature of oxygen vacancy formation.

The plasmonic material absorbs visible light and therefore can be used to heat and support the oxygen-conducting material. When exposed to visible light near the peak plasmonic wavelength of the material, the plasmonic material can generate large amounts of heat that can dissipate to the oxygen-conducting material, causing its temperature to increase and oxygen vacancies to form through the release of molecular oxygen. In some embodiments, the plasmonic material comprises a noble metal such as gold, silver, platinum, or copper. Such noble metals exhibit unique optical properties because of their ability to excite localized surface plasmons. In some embodiments, two or more noble metals can be alloyed together or one or more noble metals can be alloyed with another metal, such as copper, aluminum, chromium, or zinc. In some embodiments, smaller metal particles, such as metal nanoparticles having nominal dimensions (e.g., diameters) of approximately 3 to 10 nm, are used because they are more likely to generate localized heat as opposed to initiating a radiative Rayleigh scattering process.

The wavelength corresponding to the absorption peak and the scattering efficiency of the metal particles are important factors that dictate the plasmonic properties of the material. These properties can be manipulated by controlling the particle composition, size, aspect ratio, shape, particle-to-particle distance, and surrounding dielectric medium. In some embodiments, bimetallic nanoparticles are an attractive option for manipulating the plasmonic properties because they offer additional degrees of freedom for tuning their optical properties by altering atomic composition and atomic arrangement. The ability to tune the position of the absorption peak over a wide range of wavelengths enables the capture of the entire wavelength range of the solar spectrum and is useful for solar applications. The use of composition rather than size and/or shape advances the potential for controlling the light absorption wavelengths to temperatures not previously possible.

The temperature to which the plasmonic material rises when exposed to light at its peak plasmonic wavelength depends upon the particular material that is used. In some embodiments, however, the selected material can rise in temperature of approximately 5 to 250° C. in response to plasmonic absorption of visible light.

Various ratios of oxygen-conducting material and plasmonic material can be used to form the catalyst material. In some embodiments, the catalyst material comprises approximately 80 to 95% oxygen-conducting material and 5 to 20% plasmonic material by weight.

When the composite catalyst material cools, as when it is no longer exposed to sunlight, the temperature of the oxygen-conducting material and the number of its oxygen vacancies decrease. Carbon dioxide is converted to carbon monoxide because of re-oxidation of the material. Thus, carbon dioxide becomes enriched in either carbon monoxide or oxygen depending upon the light exposure and the resulting temperature change. With the process driven by visible light absorption, the energy limitations typically associated with the conversion of carbon dioxide are alleviated.

Figure 3:
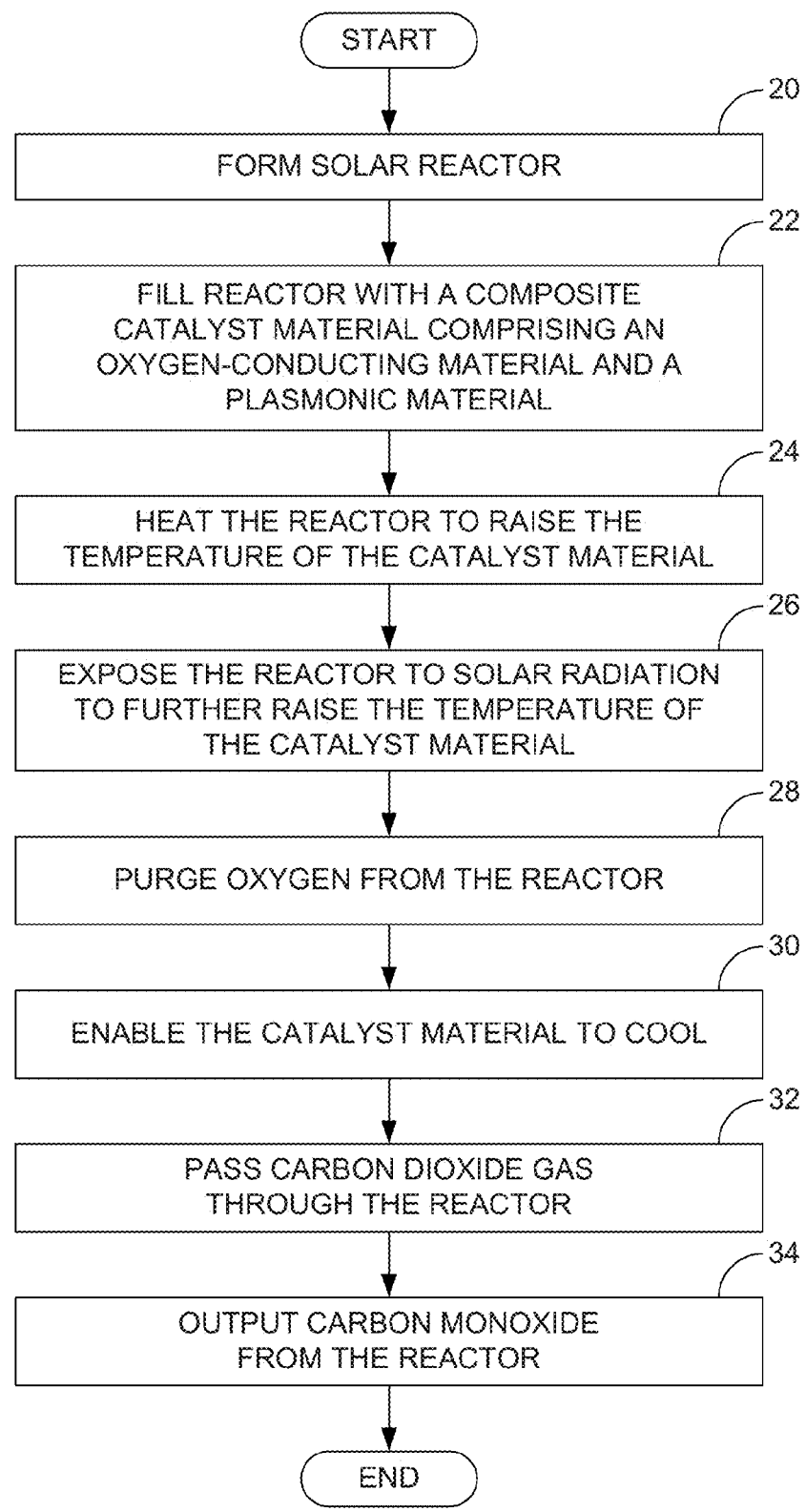
FIG. 3 is a flow diagram of an embodiment of a method for converting carbon dioxide into chemical feedstock.

FIG. 3 illustrates an example method for converting carbon dioxide into carbon monoxide that reflects the discussion of FIG. 2. Beginning with block 20, an appropriate solar reactor is formed. As described above, the reactor can be a translucent or transparent container that is made of a high-temperature material, such as quartz or a ceramic material. Once the reactor has been formed, it can be filled with a composite catalyst material that comprises oxygen-conducting material and a plasmonic material, as indicated in block 22. Example oxygen-conducting materials and plasmonic materials have been identified above.

Next, with reference to block 24, the reactor is heated to raise the temperature of the catalyst material to a first elevated temperature. By way of example, the catalyst material can be electrically heated to a temperature of approximately 250 to 550° C. Once the first elevated temperature has been reached, the reactor can be exposed to solar radiation to further increase the temperature of the catalyst material, as indicated in block 26, to a second elevated temperature at which oxygen vacancies will be formed in the oxygen-conducting material. In some embodiments, the reactor can simply be placed in a location in which it is immersed in sunlight. In other embodiments, a solar concentrator (not shown) can be used to focus the sun's rays on the reactor. As the sunlight passes through the walls of the reactor, the energy of the sunlight is absorbed by the plasmonic material, which exhibits plasmonic absorption of the visible light. In some embodiments, this absorption increases the temperature of the plasmonic material by approximately 5 to 250° C. and its heat dissipates to the oxygen-conducting material with which the plasmonic material is intimately mixed. In some embodiments, the oxygen-conducting material is heated to a temperature of approximately 200 to 800° C.

At this point, oxygen within the reactor formed by the creation of the oxygen vacancies can be purged from the reactor, as indicated in block 28. Next, the catalyst material is enabled to cool, as indicated in block 30. In some embodiments, such cooling can be achieved by blocking the solar radiation so that it does not impinge upon the reactor. In other embodiments, the amount of heat supplied to the reactor can be reduced.

Referring next to block 32, carbon dioxide gas is passed through the reactor so that it flows through the catalyst material. The oxygen-conducting material removes oxygen atoms from the carbon dioxide to convert it to carbon monoxide. Accordingly, carbon monoxide can be output from the reactor, as indicated in block 34. The above-described cycle can then be repeated as desired to continue the carbon dioxide conversion process.

Figure 4:
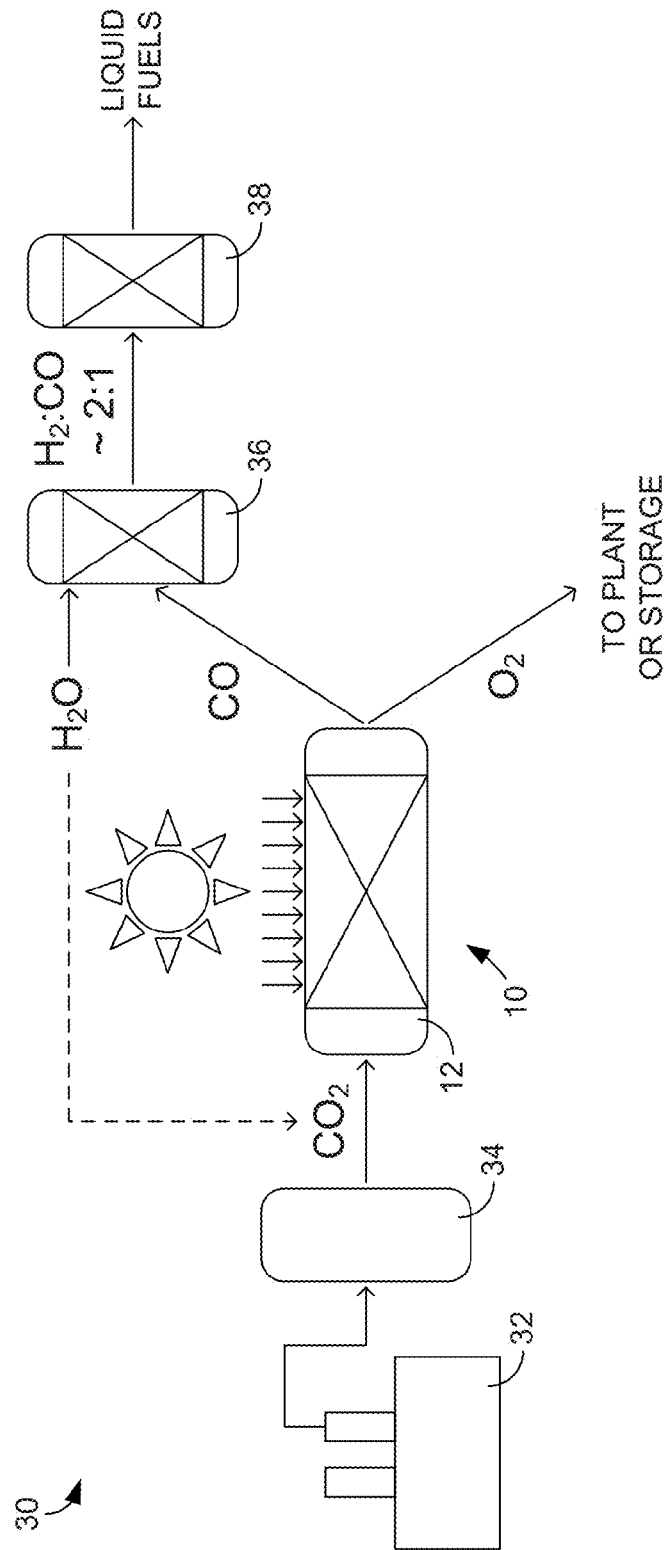
FIG. 4 is a block diagram of a system for converting carbon dioxide into chemical feedstock and for producing a product using the feedstock.

FIG. 4 depicts a further system 30 that illustrates an example application of the system 10 of FIG. 2 and the method of FIG. 3. The system 30 shown in FIG. 4 includes an emissions source 32, such as a power plant, that outputs carbon dioxide. The carbon dioxide from the source 32 can be purified by a carbon dioxide separation system 34 and the purified carbon dioxide can be provided to the solar reactor 12 of the carbon dioxide conversion system 10. As indicated in FIG. 3, the reactor 12 is exposed to solar radiation provided by the sun and oxygen can be generated by the reactor once the temperature of the oxygen-conducting material has risen to an appropriate temperature, such as approximately 200 to 800° C. and, as indicated in FIG. 4, can be provided to another plant or stored for later use in other applications. When the reactor is permitted to cool, for example, when the reactor is shielded from the sun or after the sun sets, carbon dioxide can be passed through the reactor and carbon monoxide can be output from the reactor.

As is further shown in FIG. 4, the carbon monoxide output from the reactor 12 can be provided along with steam to a water/gas shift (WGS) reactor 36 that operates at a temperature of approximately 200 to 500° C. and produces hydrogen from the steam. As indicated by the dashed line, the steam can alternatively or additionally be input into the solar reactor 12 along with the carbon dioxide to generate hydrogen. In such a case, the WGS reactor 36 may not be necessary. Hydrogen and carbon monoxide, for example in a 2:1 ratio, can be provided to a Fischer-Tropsch synthesis (FTS) reactor 38 that operates at approximately 220 to 350° C. to produce one or more liquid fuels.

Figure 5:
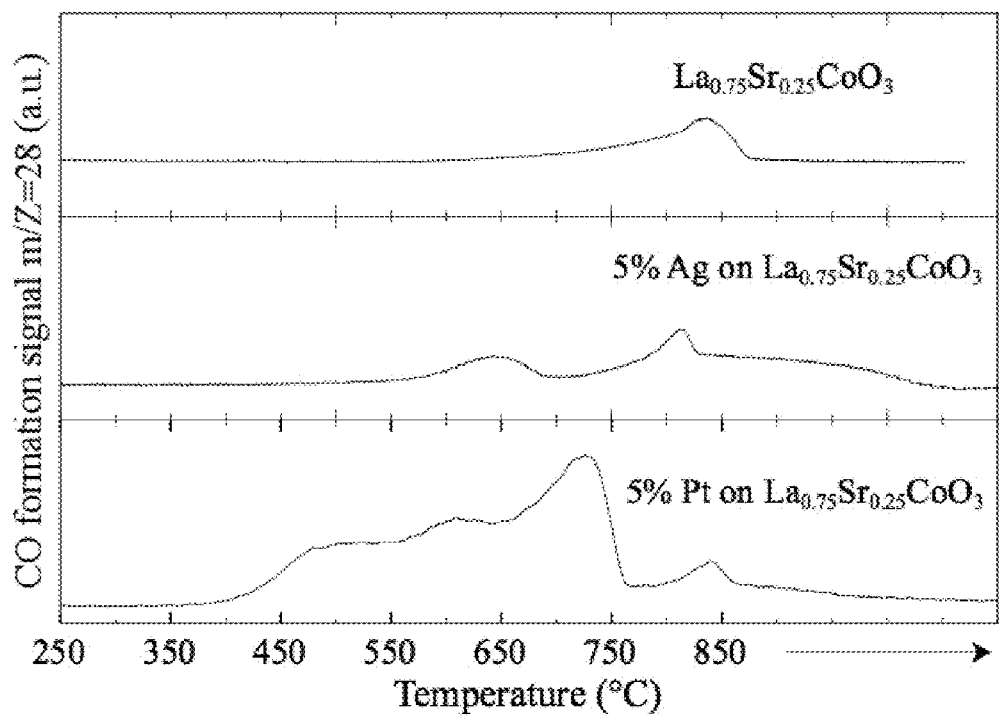
FIG. 5 comprises graphs that illustrate conversion of carbon dioxide (from 10% $CO_2$/He) to carbon monoxide using partially-reduced Ag/or Pt/$(La_{0.75}Sr_{0.25})CoO_{3-\delta}$.

At the temperatures described in relation to FIG. 4, there is little concern for the morphology change, including aggregation of the plasmonic phase, because plasmonic nano-particles are stable under these conditions, even on more inert supports such as silica. In addition to the solar heating via plasmonic phase, a catalytic effect caused by the addition of the noble metals may occur. As shown in FIG. 5, it has been verified that silver (Ag) and platinum (Pt) both cause a major decrease in the $CO_2$ conversion temperature. Isothermal $CO_2$ conversion studies also support these findings. With $CO_2$ conversion occurring at temperatures as low was 400° C. (for Pt, not optimized particle morphology and bimetallic composition), it can be appreciated that there is great potential for the process shown in FIG. 4. In alternative embodiments, the solar reactor 12 can be conventionally heated to a temperature of approximately 250° C. and then the chemistry would be induced through additional heating via exposing the plasmonic phase to visible light.

Recently, ceria and its inherent non-stoichiometry at elevated temperatures has been explored for $CO_2$ conversion. An issue with ceria is that solar heating to generate oxygen vacancies from ceria occurs at extremely high temperatures (1,800 K) and requires concentrated solar light. As demonstrated by the data of FIG. 5, however, metal/perovskite-type oxide composites can generate oxygen vacancies and convert carbon dioxide at temperatures greater than 1,000 K lower than ceria. This finding indicates that concentrated solar energy is not necessary and that natural light can be used.

The above-described carbon dioxide conversion approach is innovative on several levels. First, thermally-driven separation induced by visible light absorption is a novel concept. Second, the use of bimetallic particles as a way to control the peak plasmonic absorption wavelength is a better approach than the traditional methods, such as altering particle size and shape, because of the temperatures needed for the conversion. Third, the use of perovskite-type oxides for carbon dioxide separation is largely unexplored. As compared to using the phase change of a metal/metal oxide pair, temperature sensitivity and long-term stability are enhanced by using a change in oxygen content within a single phase, as is possible with perovskite-type oxides. The combination of these innovations provides a materials platform that transforms the current limitations in carbon dioxide conversion.

Figure 6:
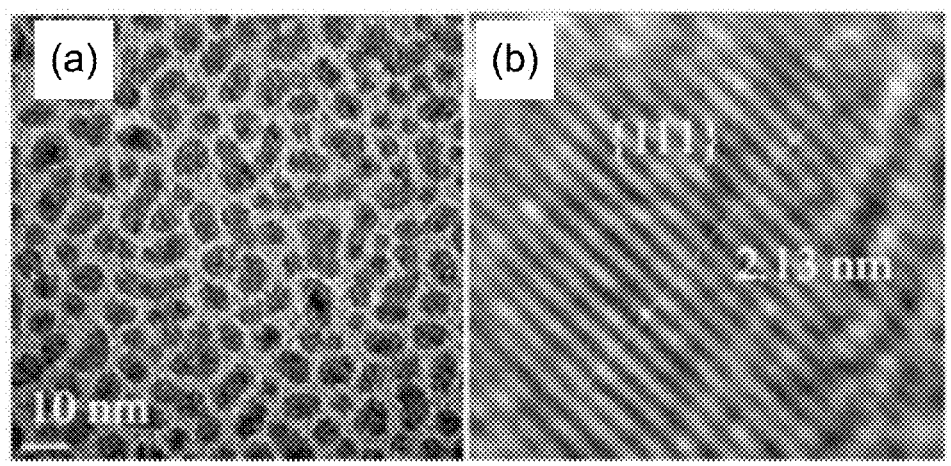
FIGS. 6(a) and 6(b) are high-resolution transmission electron microscopy (HR-TEM) images of Ag—Cu nanoparticles with a size distribution of 14.8±5.4 nm (derived from a population of 100 particles) and a composition of Ag:Cu=1:1.
Figure 7:
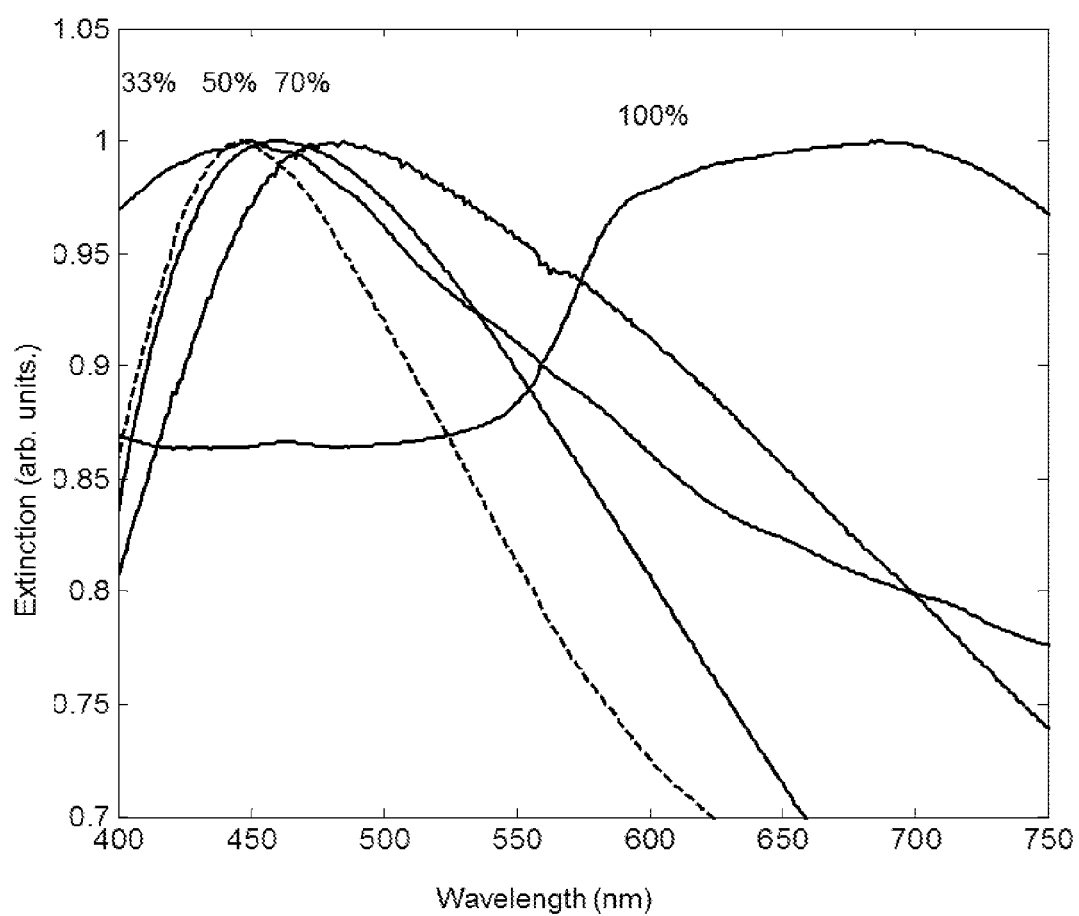
FIG. 7 is a graph of normalized extinction spectra for Ag—Cu nanoparticles at different percentages of Cu. The solid lines show the extinction spectra of Ag—Cu nanoparticles in solution and the dotted line shows the extinction spectra of Ag—Cu nanoparticles with 33% Cu on APS-coated glass slides.

Preliminary studies were performed experimentally and computationally on the synthesis, characterization, and properties of silver nanoparticles and experimentally on the synthesis, characterization, and properties of complex perovskite-type metal oxides. Ag—Cu nanoparticles were found to serve as excellent candidates for metal enhanced fluorescence (MEF) because of their interesting optical properties. Ag—Cu nanoparticles of approximately 15 nm in average size were synthesized by colloidal routes (see, e.g., FIG. 6). These particles were used to demonstrate a simple technique to tune the brightness of a luminophore by modifying the composition and atomic arrangement. Both the breadth and location of the peak of the surface plasmon resonance (SPR) spectrum of the Ag—Cu nanoparticles were tuned (FIG. 7). Ag—Cu nanoparticles greater than 10 nm were predicted to maximize the plasmonic enhancement with an optimal particle size of approximately 50 nm being predicted in previous studies conducted by the inventors. While the radiative decay used in MEF is larger for particles of approximately 50 nm, what is useful for this catalysis application is non-radiative decay, which is conveniently larger in smaller particles.

Figure 8A:
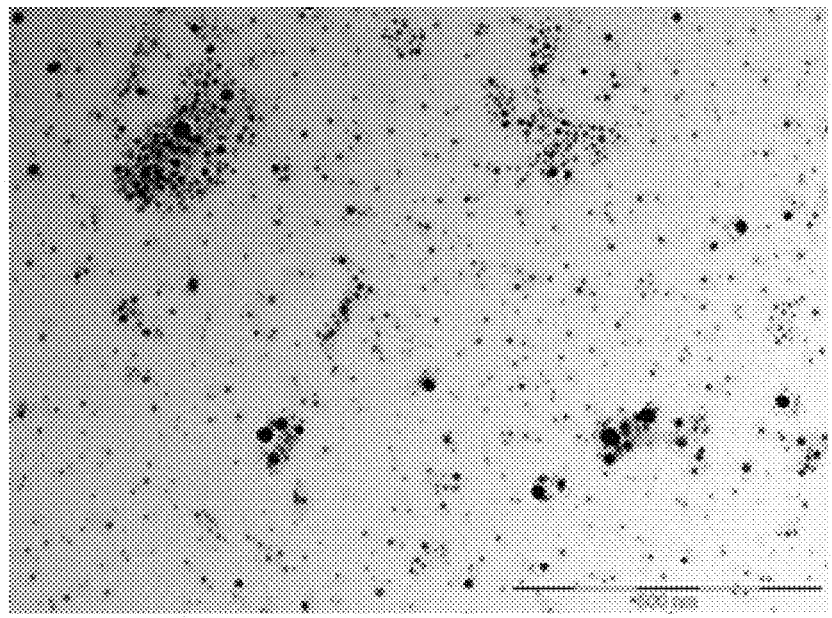
FIGS. 8A and 8B comprise HR-TEM images of (A) approximately 3-nm Ag nanoparticles and (B) approximately 3-nm Ag—Pt nanoparticles (200 nm scale bar in both images).
Figure 8B:
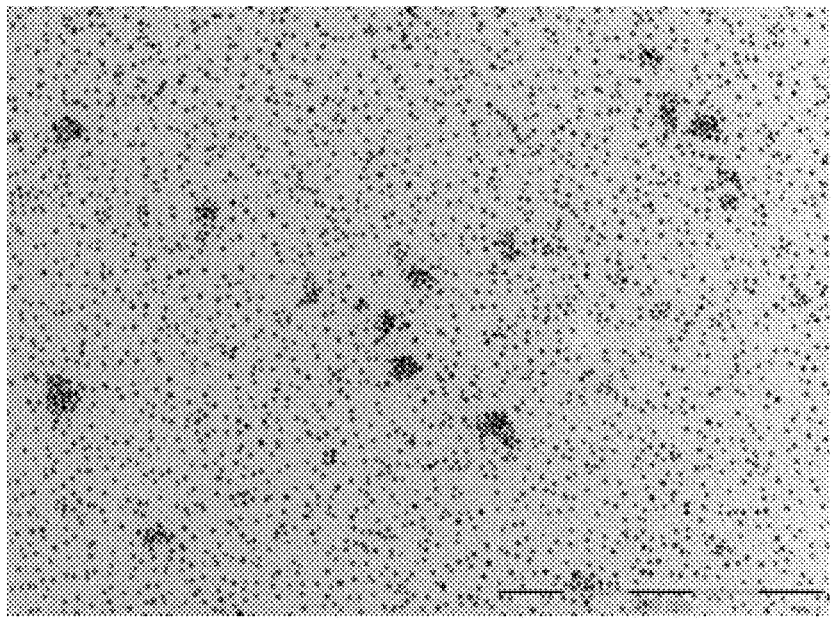
Figure 9:
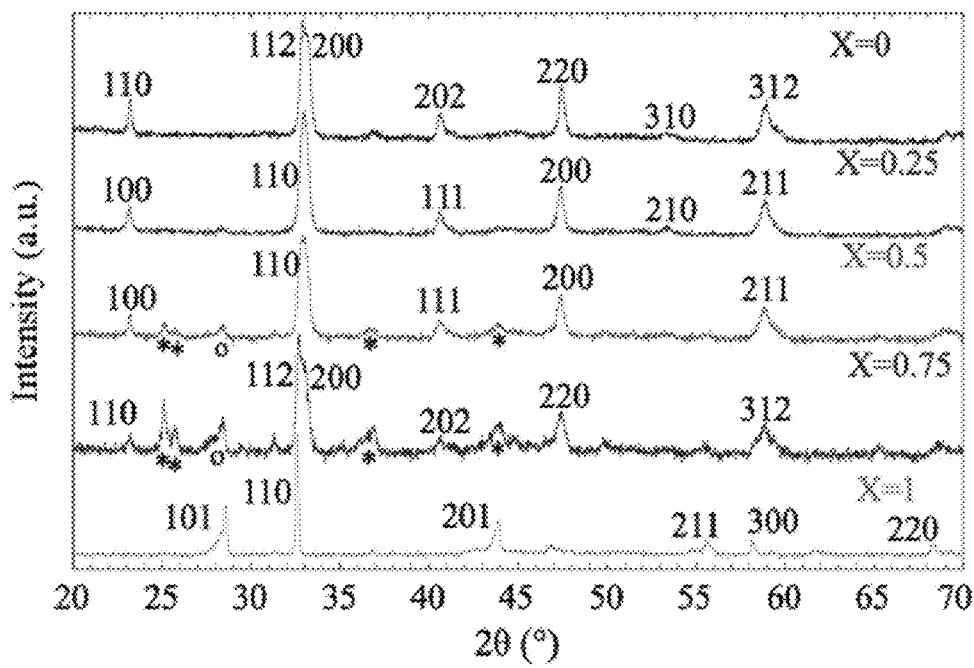
FIG. 9 is a graph of powder x-ray diffraction data collected from $(La_{1-x}Sr_x)CoO_3$ samples. (The intensity signal values have been offset for viewing purposes.)

Because small particles are generally desired to maximize the conversion per mass of catalytic materials, Ag-based bimetallic particles that are smaller than 10 nm were synthesized. In particular, approximately 10-nm Ag—Pd bimetallic nanoparticles and approximately 3-nm Ag and Ag—Pt nanoparticles were synthesized (see FIG. 8 for the latter two types of particles).

In addition to the above-described work, perovskite-type oxides with various La:Sr ratios were synthesized using a modified-Pechini process. Extensive calcination studies were performed to optimize the temperature needed to remove the templating agents without causing aggregation. Optimal calcination temperatures near 700° C. were identified, which led to specific surfaces of approximately 5 to 10 $m^2/g$ (measured by standard nitrogen isotherms at T=77K and BET isotherm analysis). These values are consistent with expected findings. The success of the synthesis was confirmed by x-ray diffraction (XRD, FIG. 12) and temperature-programmed reduction (TPR, FIG. 10). In the XRD profiles, samples with Sr content of X=0 and X=0.75 were found to be tetragonal while the powders with X=0.25 and X=0.5 were found to be cubic, which is recognized to favor oxygen mobility in the samples while maintaining phase stability. The sample containing pure Sr showed an hexagonal crystalline profile.

Traces of other oxides: strontium carbonate and strontium oxalate were observed in samples with X=0.5 and X=0.75, demonstrating impure phases as usually seen in these patterns. The TPR profiles are consistent with multiple reduction steps. The low-temperature reduction (below ~550° C. for all samples) represents a reduction of the tetravalent transition metal to the trivalent state. The high-temperature feature (600 to 800° C.) is associated with a combined reduction of the cobalt from a trivalent to divalent state and the loss of the perovskite phase that can include further reduction of cobalt to the metallic state. These materials were used in initial studies, which showed that a La:Sr ratio of 3:1 was optimal compared to La:Sr ratios of 1:0, 1:1, 1:3, and 0:1 (all ratios are molar) for low-temperature generation of oxygen vacancies and carbon dioxide conversion following oxygen vacancy formation.

Figure 10:
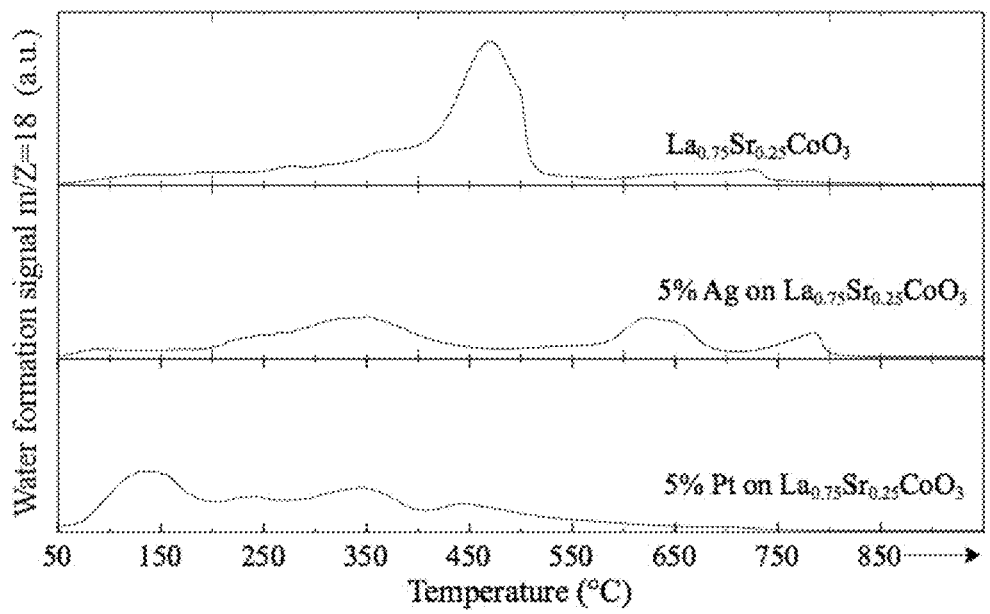
FIG. 10 is a graph of hydrogen temperature-programmed reduction (TPR) of Ag/and Pt/$(La_{0.75}Sr_{0.25})CoO_3$ samples. (The signal for consumption values has been offset for viewing purposes.)

The TPR profiles shown in FIG. 10 demonstrate that the deposited metal greatly reduced the temperature at which oxygen vacancies form as indicated by the formation of water through the reaction of hydrogen with lattice oxygen. Following reducing treatments, the oxygen vacancies of the various materials were used to extract an oxygen atom from carbon dioxide to form carbon monoxide. The additional oxygen vacancies and/or the synergistic role of the deposited metal led to facile carbon dioxide conversion of the composite samples over the bare mixed oxides.

A further study was performed to test the capability of lanthanum cobaltites $La_{1-x}Sr_xCoO_3$ ($0 \leq X \leq 1$ in steps of 0.25) in reducing carbon dioxide. As described below, the results show that carbon dioxide was effectively converted to carbon monoxide while using pre-treated oxides but the perovskite structure was lost due to the high pretreatment temperatures (600° C.). Different pre-treatment temperatures were examined (400, 500, and 600° C.) and it was determined that 500° C. is a viable temperature for the perovskite reduction. Furthermore, different carbon dioxide conversion temperatures were tested (650, 750, and 850° C.) and the highest carbon monoxide production was achieved when the reaction occurred at 750° C.

$La(NO_3)_3$ (Aldrich), $SrCO_3$ (Alfa Aesar), and $CoCO_3$ (Aldrich) were dissolved in an aqueous solution of citric acid (Aldrich) at 60° C. for 2 hours. Ethylene glycol (Aldrich) was then added while stirring the mixture at 90° C. for 12 hours following a Pechini synthesis with modifications to the compounds, ratios (A site:B site:CA:EG=1:1:10:40). After a polymer was formed, the sample was heated in air at 450° C. for 2 hours. Following this heating, a TPO-$O_2$ with 20% $O_2$/He was performed on the samples with an Sr content of X=0 and X=1 to determine their optimal charring temperature.

XRD was performed in a Phillips x-ray diffractometer with a CuKα ($\lambda$=0.154 nm) using a step size of 0.02 at 25° C. for both the fresh samples and after the isothermal $CO_2$ conversion. Multiple BET surface area studies were performed in a gas sorption system (Autosorb iQ Quantachrome) for the fresh samples and after the isothermal $CO_2$ conversion at 850° C. During the outgassing, the samples were heated at a ramp rate of 10° C./min until 200° C. and were held there for 3 hours.

TPR experiments were performed with a thermal conductivity detector in a gas sorption system (Autosorb iQ Quantachrome). The analysis gas was a mixture of 5% $H_2/N_2$ with a total 50 sccm flow. The temperature was increased at a ramp rate of 10° C./min from room temperature to 800° C. where it was held for 30 minutes.

Temperature-programmed oxidation with $CO_2$ (TPO-$CO_2$) experiments were performed in an MKS Cirrus mass spectrometer. After a pretreatment at 600° C. under 10% $H_2$/He for 30 minutes, the sample was cooled down in He to 100° C. Then 10% $CO_2$/He was flowed to the sample while it was heated to 850° C. at a ramp rate of 10° C./min and was held at that temperature for 30 minutes. The total gas flow was held constant at 50 sccm.

After a pretreatment at 400° C., 500° C., or 600° C. under 10% $H_2$/He for 30 minutes, the perovskites re-oxidation was studied in an MKS Cirrus mass spectrometer. The materials were ramp rated at 10° C./min in He to specified temperatures (850, 750, and 650° C.). After stabilization at the desired temperature, isothermal oxidation with $CO_2$ occurred. The reaction environment was changed to 10% $CO_2$/He and was held for 30 minutes.

In-situ XRD was performed on the $La_{1-x}Sr_xCoO_3$ (X=0.25) in a Bruker D8 x-ray diffractometer with a CuKα ($\lambda$=0.154 nm) while heating in an inert (50 sccm He) and reducing environment (5 sccm $H_2$/50 sccm He). The heating ramp rate was approximately 25° C./min and the scan rate was 2.5°/min. The heating ramp rate was 25° C./min and was held for 10 minutes before the patterns were collected, at a scan rate of 2.5° C./min.

Figure 11:
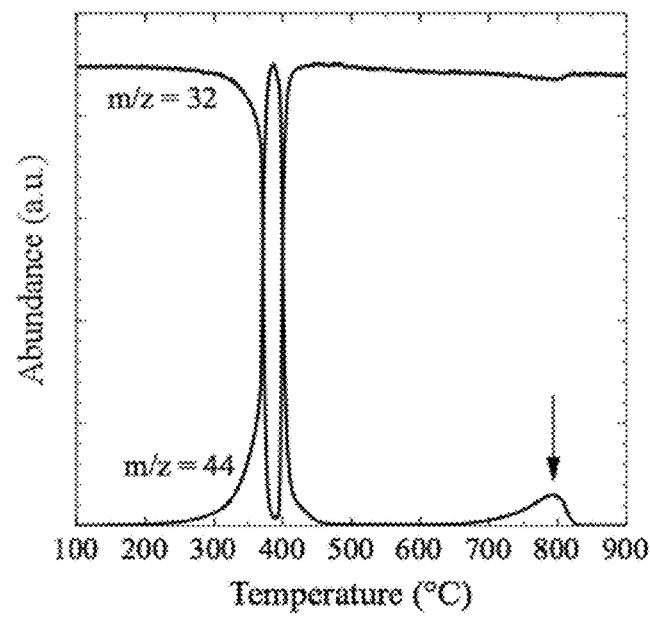
FIG. 11 is a graph of a temperature-programmed oxidation (TPO) profile of uncharred $LaCoO_3$.

FIG. 11 shows a TPO performed on $LaCoO_3$ (X=0) after the esterification reaction and the first heating at 450° C. At 360° C., oxygen consumption that forms a carbonate species can be seen, as is consistent with literature. At this point, the sample was present as an amorphous powder as demonstrated by XRD (not shown). A small peak at 650° C. suggests the formation of more carbonate species, which might be due to traces of the precursors still on the powder, which may be explained as a characteristic of the crystallization yielding to the perovskite-structure.

A similar experiment was performed on the $SrCoO_3$ (X=1) sample and the crystallization peak was seen at 700° C. From these experiments, 700° C. and 750° C. were chosen for the second heating temperature for the samples with a Sr content of $0 \leq X \leq 0.75$ and X=1 respectively.

Figure 12:
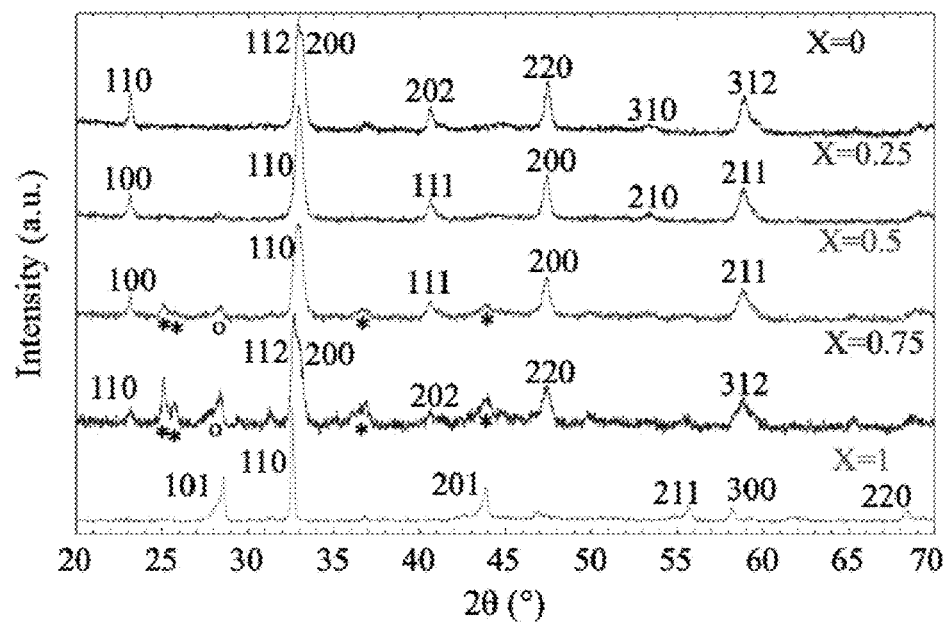
FIG. 12 is a graph of x-ray diffraction patterns of fresh $(La_{1-x}Sr_x)CoO_{3-\delta}$ powders and $(La_{0.75}Sr_{0.25})CoO_{3-\delta}$ after isothermal reduction at 500° C. and $CO_2$ conversion at 850° C.

The data shown in FIG. 12 shows the XRD profiles of the as-synthesized materials and $La_{0.75}Sr_{0.25}CoO_{3-\delta}$ after isothermal $CO_2$ conversion. Samples with a Sr content of X=0 and X=0.75 were found to be tetragonal, while the powders with X=0.25 and X=0.5 were found to be cubic, which favors them over the rest towards higher oxygen mobility while maintaining phase stability. The sample containing pure Sr was found to be hexagonal. Traces of other oxides, including strontium carbonate and strontium oxalate, were observed in samples with X=0.5 and X=0.75, demonstrating impure phases as usually seen in these patterns. The surface areas of the samples were studied and no significant change was observed between the fresh and post-reaction results. Fresh samples presented an area ranging from 3 to 10 $m^2/g$, while the post-reaction BET showed between 3 to 15 $m^2/g$.

Figure 13:
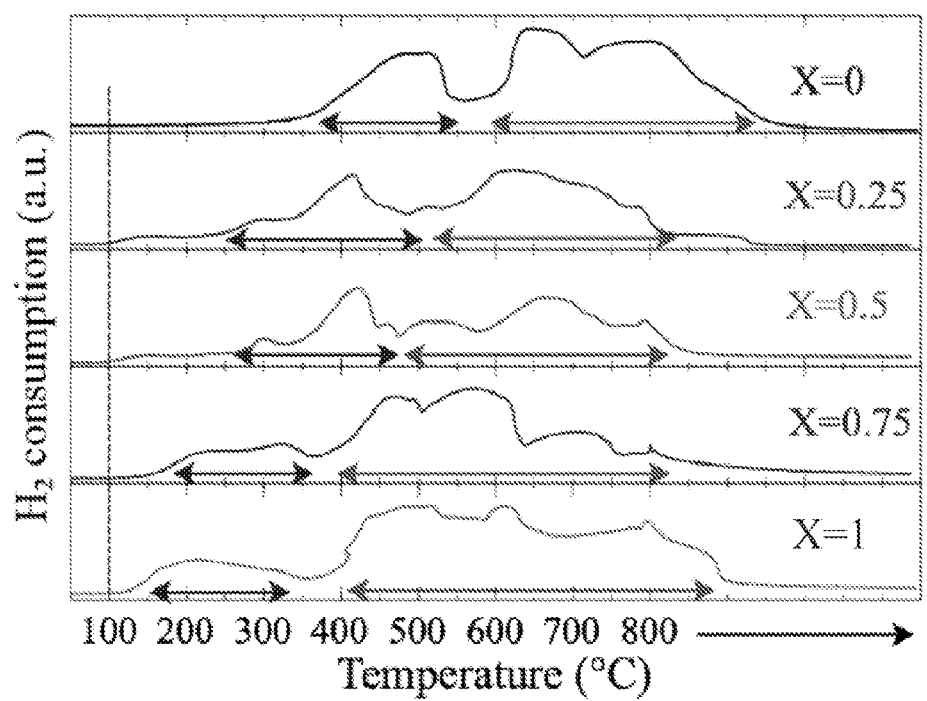
FIG. 13 is a graph of TPR with 5% $H_2/N_2$ of $(La_{1-x}Sr_x)CoO_3$ samples.

The TPR profiles shown in FIG. 13 show the reducibility of the samples as a function of temperature and X.

The peak positions and onset temperatures evidence the relationship between the samples' reducibility and X. The highest onset temperature is needed for the powder with X=0 while the lowest onset reduction temperature is presented by the powders with X=0.25 and X=0.5. Likewise, onset for the second peak shows the same trend for each powder.

It is apparent that partial Sr substitution augments the reducibility of the powders by the instability created by divalent cations on the A site, which leads to a coexistence in the B-site cation between tetravalent and trivalent cobalt, which further reduces to divalent and metallic cobalt, inducing phase changes. However, after an optimum amount of Sr has been incorporated (which increases the amount of alpha oxygen that can be desorbed, as for samples with X=0.25 and X=0.5), further Sr substitution decreases the amount of oxygen in the alpha region. As seen in FIG. 13, samples with X=0.75 and X=1 have a lower area for the alpha oxygen and a higher area for beta oxygen compared with the rest of the samples. In each sample, the first peak is attributed to hydrogen consumption by the surface and lattice oxygen (which leads to the reduction of $Co^{4+}$ to $Co^{3+}$ and $Co^{3+}$ to $Co^{2+}$), while the second peak is attributed to the consumption of hydrogen from the bulk oxygen (reduction of $Co^{3+}$ to $Co^{2+}$ and $Co^0$), which leads to the phase changes. Table 1 summarizes the temperature range in which both alpha and beta oxygen peaks are seen in each sample.

TABLE 1

Summary of oxygen desorption peaks from TPR data.

| Sample (Sr content) | Alpha oxygen (temp range ° C.) | Beta Oxygen (temp range ° C.) |
|---|---|---|
| X = 0 | 350-550 | 550-800 |
| X = 0.25 | 100-475 | 475-800 |
| X = 0.5 | 100-475 | 475-800 |
| X = 0.75 | 150-350 | 350-800 |
| X = 1 | 150-350 | 350-800 |

Figure 14:
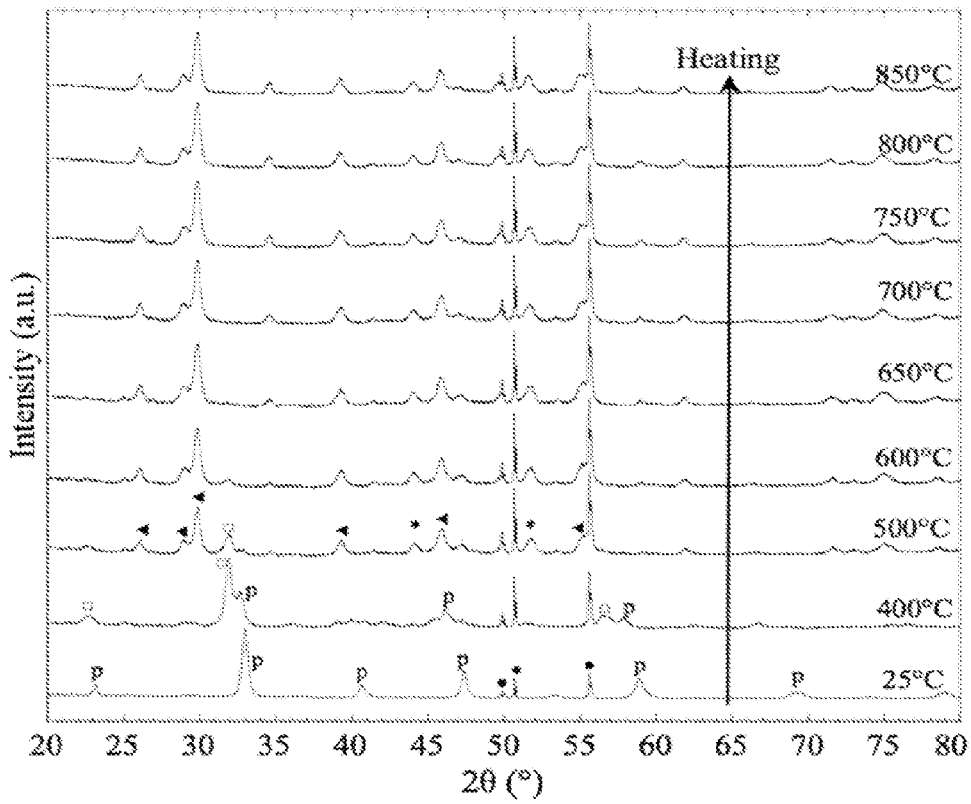
FIG. 14 is a graph of changes in a $La_{0.75}Sr_{0.25}CoO_3$ crystalline structure while it is heated in 10% $H_2$/He.

In-situ XRD patterns of $La_{0.75}Sr_{0.25}CoO_3$ under hydrogen heating shown in FIG. 14 demonstrate the evolution of the crystalline structure while undergoing hydrogen reduction. At 25° C., the powder maintains its cubic perovskite structure, which is still noticeable at 400° C. (under the α-oxygen region) when the powder transitions to a perovskite-like phase $SrLaCoO_4$. At 500° C., (transition between α-oxygen region and β-oxygen region) the perovskite phase is seen as traces (the characteristic peaks have shifted slightly to the left by consequence of cell thermal expansion). The spinel-type $SrLaCoO_4$ phase has also been reduced and the appearance of metallic cobalt and lanthanum oxide are noticeable. Strontium might be present in an amorphous phase or in very small metallic particles, not detected by XRD. Further reduction above 600° C. (β-oxygen region) shows the predominance of $La_2O_3$ and the total destruction of the initial perovskite and the spinel-type phase.

Because it takes longer to perform the in-situ XRD experiments, a pure cubic perovskite phase might still be present at higher temperatures during the conventional TPR. The set of peaks at 50°, 51° and 55° seen on the profile are due to a quartz sample holder and remain constant throughout the heating.

Figure 15:
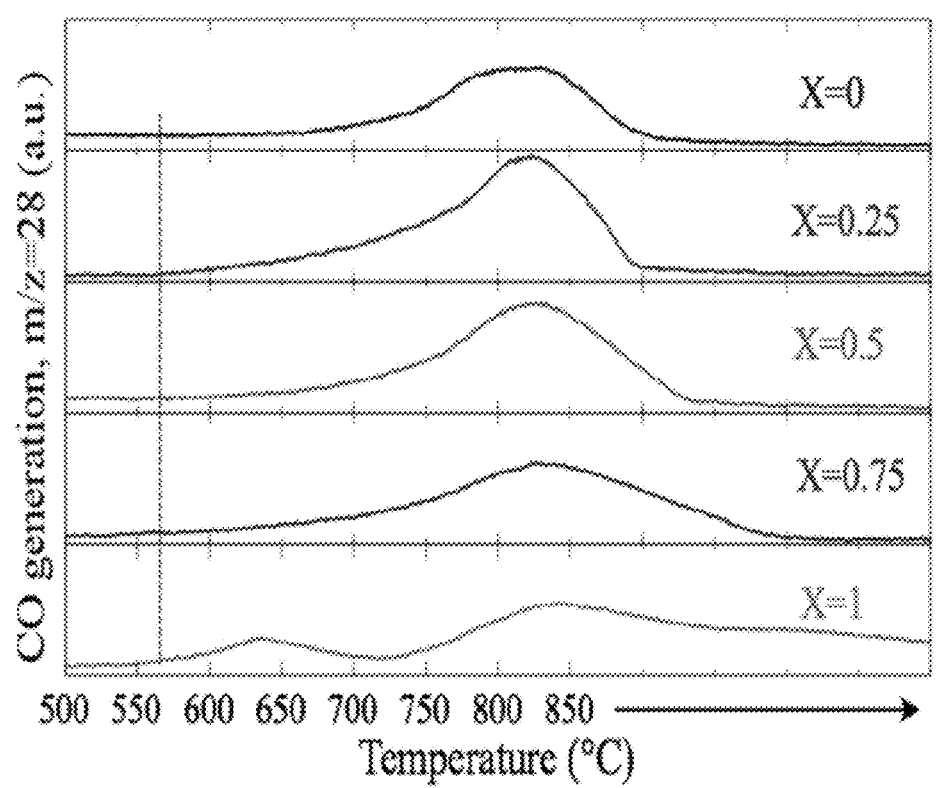
FIG. 15 is a graph of carbon monoxide generation with 10% $CO_2$/He using partially-reduced $(La_{1-x}Sr_x)CoO_{3-\delta}$.

The $TPO-CO_2$ profiles of FIG. 15 show that carbon dioxide was effectively reduced to carbon monoxide on the $H_2$-pretreated oxides with the highest conversion peak being achieved at approximately 850° C.

As X increases, the peaks demonstrating $CO_2$ conversion become broader and decrease in intensity, demonstrating that increasing the Sr substitution increases the difficulty of the re-oxidation of the perovskite. A similar experiment with oxygen (not shown) revealed that, as the Sr content increases in the perovskite, so does the temperature needed for its re-oxidation with oxygen. $SrCoO_{3-\delta}$ shows two carbon monoxide generation regions suggesting that the phase transition suffered by the oxide structure during the $H_2$-pretreatment does not favor the conversion of $CO_2$ and the sample might be converted to other phases instead of re-oxidizing with the carbon dioxide. The high stability of the X=0 sample shifts the re-oxidation of the perovskite towards higher temperatures. Even though the peaks become broader with X, the lowest onset temperature approximately 560° C. is achieved by the three samples with both cations on the A site.

A pure crystalline phase is preferred because it facilitates the study over the phases actively involved in the reaction. For that reason, the sample with X=0.25 was chosen to study isothermal $CO_2$ to CO conversion at different temperatures.

A reduction/$CO_2$ re-oxidation matrix was created to explore the optimum conditions for the $La_{0.75}Sr_{0.25}CoO_3$ perovskite's isothermal reduction (400, 500, and 600° C.) and subsequent isothermal $CO_2$ reaction temperatures (650, 750, and 850° C.). The formation of CO by moles of oxygen available in the perovskite is shown in Table 2. The data is normalized by the first 10 minutes of reaction because both the oxygen desorption process and $CO_2$ conversion are time sensitive.

TABLE 2

μ moles of CO generated per moles of oxygen in the perovskite.

| | | μmoles of Co / moles of O in the perovskite | | |
|---|---|---|---|---|
| | Reduction | Oxidation temperature | | |
| Sample | Temperature | 650° C. | 750° C. | 850° C. |
| X = 0.25 | 400° C. | <5 | 24 | 39 |
| | 500° C. | <5 | 31 | 121 |
| | 600° C. | <5 | 20 | 45 |
| X = 0.5 | 500° C. | — | — | 33 |
| X = 0 | 500° C. | — | — | 21 |

The results in Table 2 show that the highest $CO_2$ conversion is achieved at 850° C. when the perovskite is reduced for 30 minutes at 500° C. For comparative purposes, the isothermal $CO_2$ conversion was also performed with these conditions on the samples X=0.5 and X=0 which presented similar profiles for their re-oxidation with CO2. Is noticeable that the CO generation achieved with X=0.25 is higher than the achieved by X=0 and X=0.5 demonstrating that the phases formed during the $H_2$-pretreatment of X=0.25 are favored towards the re-oxidation with carbon dioxide.

A possible mechanism for the reduction of $CO_2$ could be explained by considering dissociative chemisorption energies of carbon dioxide on metal surfaces. It has been suggested that the dissociation of carbon dioxide in metallic cobalt is thermodynamically favored. This would explain why the conversion reaches a maximum when the $H_2$-pretreatment forms metallic cobalt (500° C. and 600° C.). Also, carbon dioxide is easily physisorbed into perovskite structures due to its basicity, since at 500° C. there are still complex oxides present (perovskite and perovskite-like oxides), the carbon dioxide molecules could be physisorbed into the structure of the $La_{0.75}Sr_{0.25}CoO_{3-\delta}$ and $SrLaCoO_4$ and then dissociated on the cobalt.

Post reaction XRD show the profiles of $La_{(1-X)}Sr_XCoO_3$ to identify the phase transition after the isothermal conversion at 850 and $H_2$-pretreatments at 600° C. The original single-phase cubic perovskite structure was not completely recovered during isothermal conversion at 850 and the predominant phase obtained is $LaSrCoO_4$ which suggests that aggregation in the metallic cobalt could increase the particles size which would alter the re-oxidation phase to a perovskite-like structure with larger lattice parameters than the original cubic perovskite. The predominant phase ($LaSrCoO_4$) is formed from the reduction and re-oxidation reaction for the samples containing Sr $0.25 \leq X \leq 0.75$. The samples containing Sr present $SrCO_3$, which increases with X. For X=1, only $SrCO_3$ is present in the structure.

The invention claimed is:
1. A method for converting carbon dioxide into a chemical feedstock, the method comprising:
providing a mixture of plasmonic material and oxygen-conducting material, wherein the oxygen-conducting material does not contain ceria and is a perovskite with a general formula of $ABO_3$ or a spinel-type oxide with a general formula of $A_2BO_4$ and wherein the A site element is selected from the group consisting of: beryllium, magnesium, calcium, strontium, barium, radium, lanthanum, praseodymium, neodymium, promethium, samarium, europium, gadolinium, terbium, dysprosium, holmium, erbium, thulium, ytterbium, lutetium, and two-element combinations thereof;

exposing the mixture to sunlight so that solar energy is absorbed by the plasmonic material which then heats the oxygen-conducting material so that oxygen vacancies are generated;

passing carbon dioxide through the mixture such that the oxygen-conducting material thermally separates the oxygen atoms from the carbon dioxide to form carbon monoxide.

2. The method of claim 1, wherein the plasmonic material comprises a metal.

3. The method of claim 2, wherein the metal comprises a noble metal.

4. The method of claim 3, wherein the noble metal is gold, silver, copper, or platinum.

5. The method of claim 2, wherein the metal comprises a bimetallic combination of a noble metal and another metal.

6. The method of claim 1, wherein the B site is occupied by a transition metal.

7. The method of claim 6, wherein the transition metal is one of cobalt, iron, nickel, copper, manganese, vanadium, titanium, zinc, or chromium.

8. The method of claim 6, wherein the B site contains two transition metals.

* * * * *